US012769847B2

(12) United States Patent
Teshome et al.

(10) Patent No.: US 12,769,847 B2
(45) Date of Patent: Oct. 20, 2026

(54) SYSTEMS AND METHODS FOR ENFORCING POLICIES BASED ON SECURITY POSTURE OF DATA PROCESSING SYSTEMS USING OUT-OF-BAND COMPONENTS

(71) Applicant: Dell Products L.P., Round Rock, TX (US)

(72) Inventors: Abeye Teshome, Austin, TX (US); Richard M. Tonry, Georgetown, TX (US); Bassem El-Azzami, Austin, TX (US); Mohit Arora, Frisco, TX (US); Vinodkumar Vasudev Ottar, McKinney, TX (US); Adolfo Sandor Montero, Pflugerville, TX (US); Luis Antonio Valencia Reyes, Waxahachie, TX (US); Rajaravi Chandra Kollarapu, Allen, TX (US)

(73) Assignee: Dell Products L.P., Round Rock, TX (US)

( * ) Notice: Subject to any disclaimer, the term of this patent is extended or adjusted under 35 U.S.C. 154(b) by 54 days.

(21) Appl. No.: 18/920,099

(22) Filed: Oct. 18, 2024

(65) Prior Publication Data

US 2026/0111558 A1 Apr. 23, 2026

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC ......................... G06F 21/577; G06F 2221/034
USPC ............................................................ 726/1
See application file for complete search history.

(56) References Cited

U.S. PATENT DOCUMENTS

| | | | | |
|---|---|---|---|---|
| 7,062,642 | B1 | 6/2006 | Langrind | |
| 8,042,182 | B2 | 10/2011 | Milani Comparetti et al. | |
| 8,615,785 | B2 | 12/2013 | Elrod et al. | |
| 8,869,307 | B2 * | 10/2014 | Broch | H04M 1/72463 455/410 |
| 8,924,620 | B2 | 12/2014 | Harriman et al. | |
| 9,215,244 | B2 * | 12/2015 | Ayyagari | H04L 63/1425 |
| 9,436,820 | B1 * | 9/2016 | Gleichauf | H04L 63/02 |

(Continued)

OTHER PUBLICATIONS

Sampsa Latvala1; Evaluation of Out-of-Band Channels for IoT Security; Springer:2020; p. 1-17.*

(Continued)

*Primary Examiner* — Monjur Rahim
(74) *Attorney, Agent, or Firm* — WOMBLE BOND DICKINSON (US) LLP

(57) ABSTRACT

Methods and systems for managing operation of a data processing system are disclosed. To manage operation of the data processing system, software compliance events may be identified by a management controller of the data processing system. Based on the identified software compliance event, the management controller may generate a virtual entity that hosts natively hosted applications of the data processing system and utilize an observability entity to determine whether required applications are identified in the natively hosted applications. Based on the determination, the management controller may manage installation of any required applications not hosted by hardware resources of the data processing system.

20 Claims, 6 Drawing Sheets

(56) References Cited

U.S. PATENT DOCUMENTS

| | | | | |
|---|---|---|---|---|
| 9,734,169 | B2 * | 8/2017 | Redlich | G06F 16/21 |
| 10,176,308 | B2 | 1/2019 | Mintz et al. | |
| 10,298,670 | B2 | 5/2019 | Ben-Shael et al. | |
| 10,671,765 | B2 | 6/2020 | Swierk et al. | |
| 11,036,902 | B2 | 6/2021 | Nicholas | |
| 11,102,122 | B2 | 8/2021 | Seed et al. | |
| 11,134,380 | B2 | 9/2021 | Fox et al. | |
| 11,425,158 | B2 * | 8/2022 | May | H04L 63/0853 |
| 11,487,274 | B2 | 11/2022 | Valder et al. | |
| 11,792,267 | B2 | 10/2023 | Kreiner et al. | |
| 12,438,713 | B2 * | 10/2025 | Tonry | H04L 9/0825 |
| 12,549,558 | B1 | 2/2026 | Gee | |
| 2006/0122927 | A1 | 6/2006 | Huberman | |
| 2009/0150981 | A1 | 6/2009 | Amies | |
| 2010/0058444 | A1 | 3/2010 | DeHaan | |
| 2011/0087387 | A1 | 4/2011 | Safa-Bakhsh et al. | |
| 2012/0042354 | A1 | 2/2012 | Vitiello | |
| 2012/0129503 | A1 * | 5/2012 | Lindeman | H04L 67/303 455/414.1 |
| 2012/0131685 | A1 * | 5/2012 | Broch | G06F 21/6218 726/30 |
| 2013/0254833 | A1 | 9/2013 | Nicodemus | |
| 2013/0305357 | A1 * | 11/2013 | Ayyagari | H04L 41/069 726/22 |
| 2014/0289402 | A1 | 9/2014 | Moloian | |
| 2015/0032925 | A1 | 1/2015 | Chidester | |
| 2018/0039946 | A1 | 2/2018 | Bolte et al. | |
| 2018/0198730 | A1 | 7/2018 | Cook | |
| 2018/0225194 | A1 | 8/2018 | Saleh-Esa | |
| 2019/0297097 | A1 * | 9/2019 | Gong | G06F 21/564 |
| 2020/0076806 | A1 | 3/2020 | Nassar | |
| 2020/0178072 | A1 * | 6/2020 | Hammond | G06F 21/55 |
| 2020/0280588 | A1 | 9/2020 | Greenebaum | |
| 2021/0034048 | A1 | 2/2021 | Hajizadeh | |
| 2021/0073211 | A1 | 3/2021 | Wright, Sr. | |
| 2022/0038659 | A1 | 2/2022 | Michel | |
| 2022/0171853 | A1 | 6/2022 | Andrews | |
| 2023/0056321 | A1 | 2/2023 | Warkhedi | |
| 2023/0325246 | A1 | 10/2023 | Guim Bernat | |
| 2023/0336592 | A1 * | 10/2023 | Narayanaswamy | H04L 63/20 |
| 2024/0146770 | A1 * | 5/2024 | Bosch | H04L 63/0272 |
| 2025/0039067 | A1 * | 1/2025 | Crabtree | H04L 43/028 |
| 2025/0039196 | A1 * | 1/2025 | Crabtree | H04L 43/028 |
| 2025/0068541 | A1 | 2/2025 | Wilson | |
| 2025/0130816 | A1 | 4/2025 | Jules-Perez | |

OTHER PUBLICATIONS

Ahmad Muzaffar Bin Baharudin. (Nov. 20, 2023). "How to optimize your data storage workload by offloading data within watsonx.data", IBM. watsonx.data. <https://community.ibm.com/community/user/watsonx/blogs/ahmad-muzaffar-bin-baharudin/2023/11/18/how-to-offload-data-from> retrieved on Aug. 28, 2024 (4 pages).

Belal Mahmoud. (Jan. 19, 2024). "A Complete Guide to AI Identity Verification", KYC AML Guide. <https://kycaml.guide/blog/a-complete-guide-to-ai-identity-verification/#:~: text=The%20use%20of%20artificial%20intelligence,get%20scanned%20in%20no%20time> retrieved on Aug. 28, 2024 (4 pages).

Chow et al. (Dec. 6, 2023). "How we used OpenBMC to support AI inference on GPUs around the world", CLOUDFLARE, The cloudflare Blog. < https://blog.cloudflare.com/how-we-used-openbmc-to-support-ai-inference-on-gpus-around-the-world/> retrieved on Aug. 28, 2024 (6 pages).

Cisco. "NextGen Out-of-Band Data Center Management Network with EVPN VXLAN", Jun. 23, 2023, <https://www.cisco.com/c/en/us/td/docs/dcn/whitepapers/nextgen-oob-datacenter-mgmt-nw-with-evpn-vxlan.html> retrieved on Aug. 28, 2024 (35 pages).

Perle Systems. "Out-of-Band Management: What is it and why do I need it?" webpage <https://www.perle.com/supportfiles/out-of-band-management.shtml>, 3 pages, May 20, 2024, retrieved from Internet Archive Wayback Machine <https://web.archive.org/web/20240520174409/https://www.perle.com/supportfiles/out-of-band-management.shtml> on Aug. 28, 2024.

* cited by examiner

SYSTEMS AND METHODS FOR ENFORCING POLICIES BASED ON SECURITY POSTURE OF DATA PROCESSING SYSTEMS USING OUT-OF-BAND COMPONENTS

FIELD

Embodiments disclosed herein relate generally to managing a data processing system. More particularly, embodiments disclosed herein relate to systems and methods for managing operations of data processing systems.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Figure 1A:
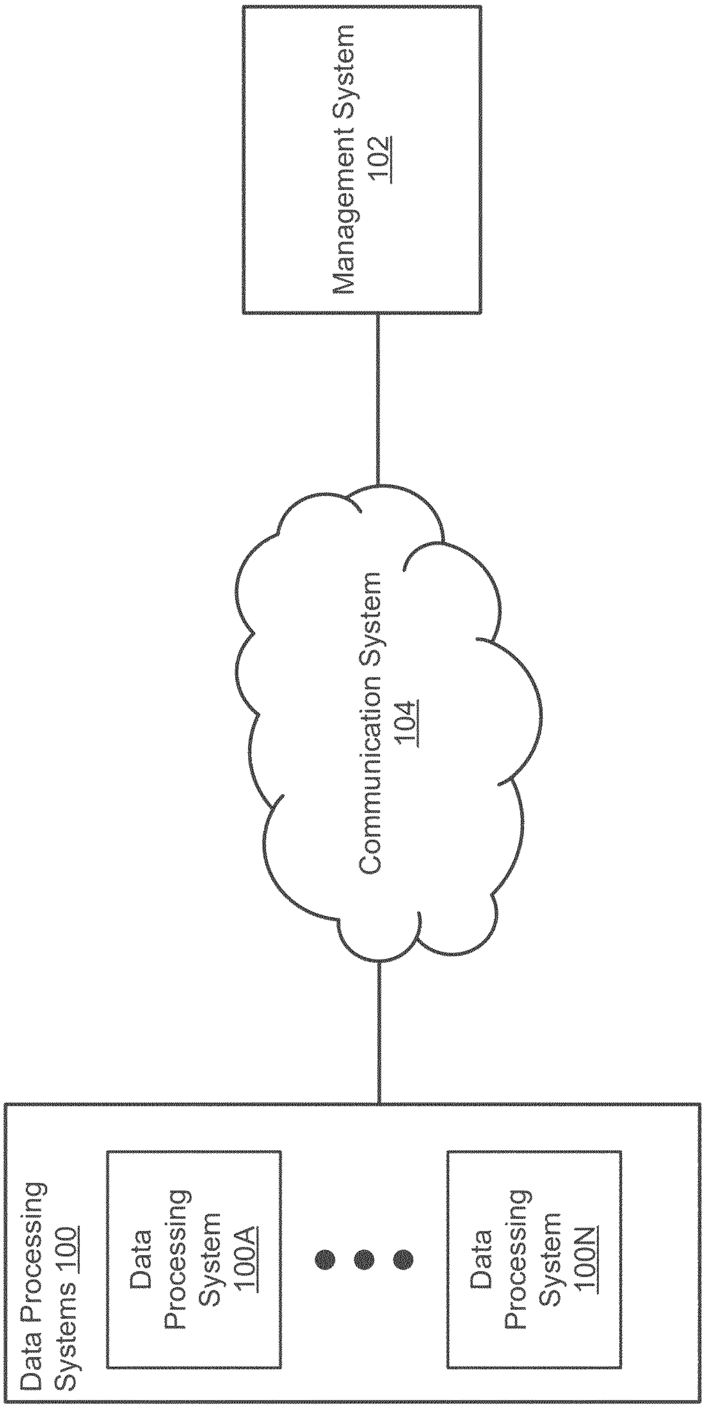
FIG. 1A shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing (operation of) data processing systems. The data processing systems may provide computer implemented services to users of the data processing systems. The computer implemented services may include any quantity and type of such services. To provide computer implemented services, restrictions for access to and/or operation of data processing systems may be implemented for security purposes. The restrictions for access to and/or operation of the data processing systems may be established by a user and/or administrator of the data processing systems by implementing and/or enforcing policies associated with security posture of the data processing systems. The policies may, for example, prohibit certain manners of operation of the data processing systems (e.g., certain types of computer implemented services) depending on the current security posture of the data processing systems.

To implement the policies, the data processing systems may include in-band components (e.g., hardware and/or software resources) that may facilitate and/or perform the desired computer implemented services. For example, an operating system of the data processing system may request, obtain, and/or otherwise manage various policies from an authorized management system (e.g., management entity, user device with authorization to manage the data processing systems, etc.).

However, identifying security posture and/or managing policies via in-band components of the data processing system may not provide an adaptable solution in the event the hardware resources (e.g., including the in-band components) of the data processing system are not functional and/or operational. For example, the hardware resources of the data processing system may become unpowered for periods of time, may be unable to connect to a communication network, and/or may become compromised by a malicious party (e.g., that may perform unauthorized modifications and/or operations of the data processing system).

Consequently, compromise and/or otherwise reduced functionality of the in-band components of the data processing system may lead to a reduction in the quality and/or availability of the computer implemented services to the user of the data processing system.

To manage operation of the data processing system in the event of compromise and/or reduced functionality of one or more in-band components of the data processing system, the data processing system may utilize out-of-band components (and/or out-of-band communication channels) to obtain and/or facilitate enforcement of policies based on the security posture of the data processing system. The out-of-band components may function independently from the in-band components of the data processing system. Consequently, if in-band components and/or in-band communication channels are compromised or non-operational, then operation management services (e.g., based on the security posture and enforcement of corresponding policies) may remain available and reliable.

By doing so, embodiments disclosed herein may provide a system for managing (operation of) a data processing system based on security posture-based policies. To do so, the data processing system may include out-of-band components such as a management controller. The management controller may, for example, identify various indications of activity (e.g., of the components of the data processing system) that may impact the security posture of the data processing system. Based on the identified security posture, the management controller may identify applicable policies and/or may perform an action set based on the identified policies in order to update operation of the data processing system. Once updated, the data processing system may be more likely to provide desired computer implemented services (e.g., secure, uninterrupted, and/or otherwise policy compliant computer implemented services).

In an embodiment, a method for managing operation of a data processing system is provided. The method may include: obtaining, by a management controller of the data processing system, at least one security posture indicator from other components of the data processing system; obtaining, by the management controller and using the at least one security posture indicator, a security posture for the data processing system, the security posture being based on at least two security posture indicators; identifying, by the management controller, any policies triggered by the security posture; in a first instance of the identifying where at least one policy of the policies is triggered by the security posture: performing, by the management controller and based on the at least one policy, an action set to update the operation of the data processing system to obtain an updated data processing system that is adapted to at least mitigate potential impacts on the operation of the data processing system due to the security posture.

The policies may include: a first security policy that specifies a first security posture level and a corresponding level of restriction on operation of the data processing system; and a second security policy that specifies a second security posture level.

The second security policy may also specify a higher level of restriction on operation of the data processing system than the level of restriction on operation of the data processing system specified by the first security policy.

The action set may include: performing, by the management controller, a supplemental policy test for a function of the data processing system that is not taken into account in the obtaining of the at least one security posture indicator to obtain a supplemental policy test result; in a first instance of the performing of the supplemental policy test where the supplemental policy test result indicates a failure of the supplemental policy test: applying a modifier to the security posture to obtain an updated security posture; and identifying any policies triggered by the updated security posture; and in a first instance of the identifying where at least one policy of the policies is triggered by the updated security posture: performing, by the management controller and based on the at least one policy of the policies that is triggered by the updated security posture, a second action set to update the operation of the updated data processing system to obtain a second updated data processing system that is adapted to at least mitigate potential impacts on the operation of the data processing system due to the updated security posture.

The action set may include at least one action selected from a list of actions consisting of: disabling, by the management controller, a portion of the other components of the data processing system; and disabling, by the management controller, a piece of software hosted by the other components of the data processing system.

The at least one security posture indicator may include at least one indicator from a list of indicators consisting of: a geographic location of the data processing system relative to a whitelist of geographic areas; a hardware componentry of the data processing system relative to a list of expected hardware components; and network connectivity of the data processing system relative to approved network connections.

The policies may be managed by a management system tasked with managing the operation of the data processing system.

The policies may be defined by a subject matter expert.

The policies may be keyed to the security posture.

The data processing system may include a network module adapted to separately advertise network endpoints for the management controller and hardware resources of the data processing system, the network endpoints being usable by a server to address communications to the hardware resources using an in-band communication channel and the management controller using an out-of-band communication channel.

The management controller and the network module may be on separate power domains from the hardware resources so that the management controller and the network module may be operable while the hardware resources are inoperable.

The out-of-band communication channel may run through the network module, and the in-band communication channel that services the hardware resources may also run through the network module.

The network module may host a transmission control protocol/internet protocol (TCP/IP) stack to facilitate network communications via the out-of-band communication channel.

In an embodiment, a non-transitory media is provided that may include instructions that when executed by a processor cause the computer-implemented method to be performed.

In an embodiment, a data processing system is provided that may include the non-transitory media and a processor, and may perform the computer-implemented method when the computer instructions are executed by the processor.

Figure 1B:
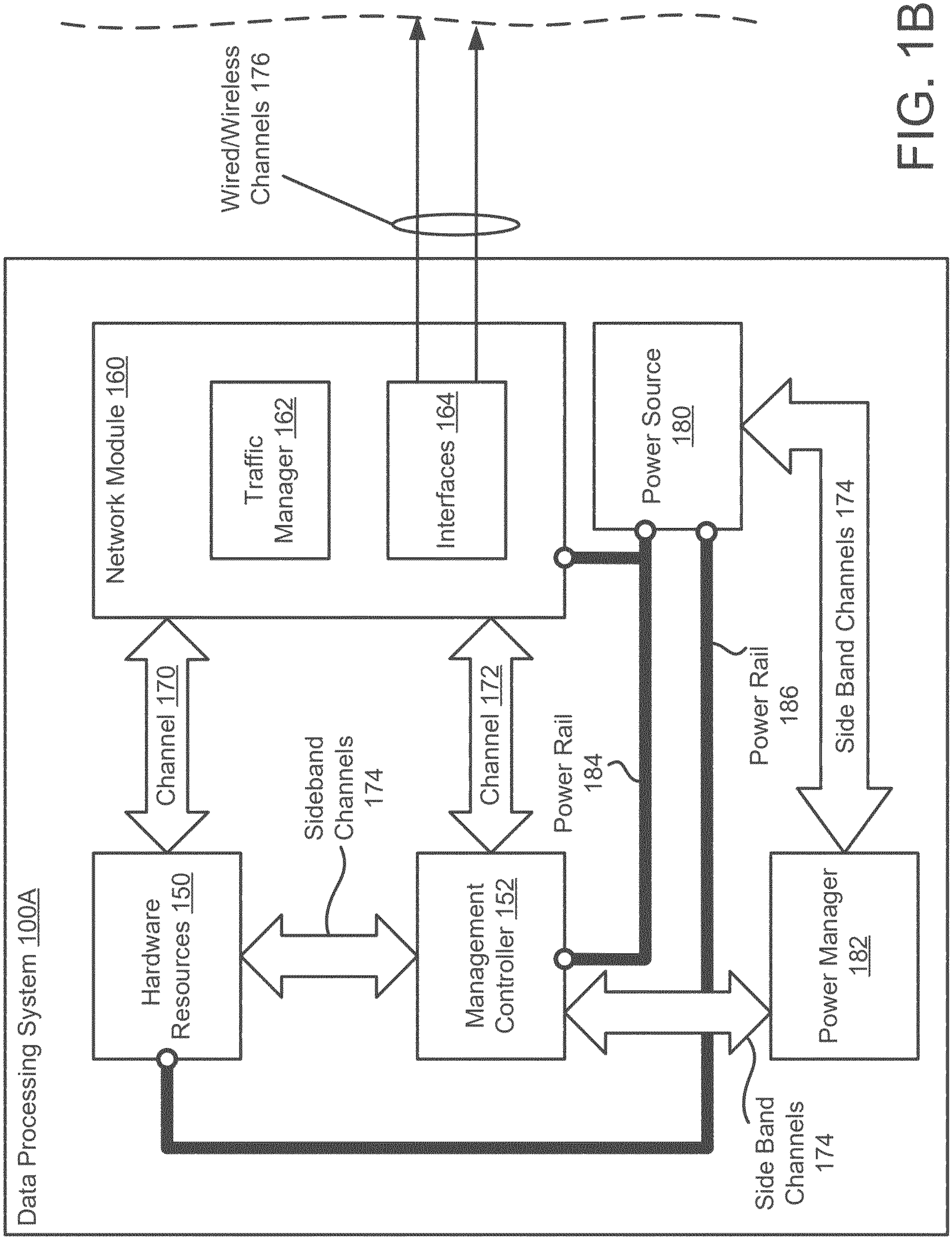
FIG. 1B shows a block diagram illustrating a data processing system in accordance with an embodiment.
Figure 4:
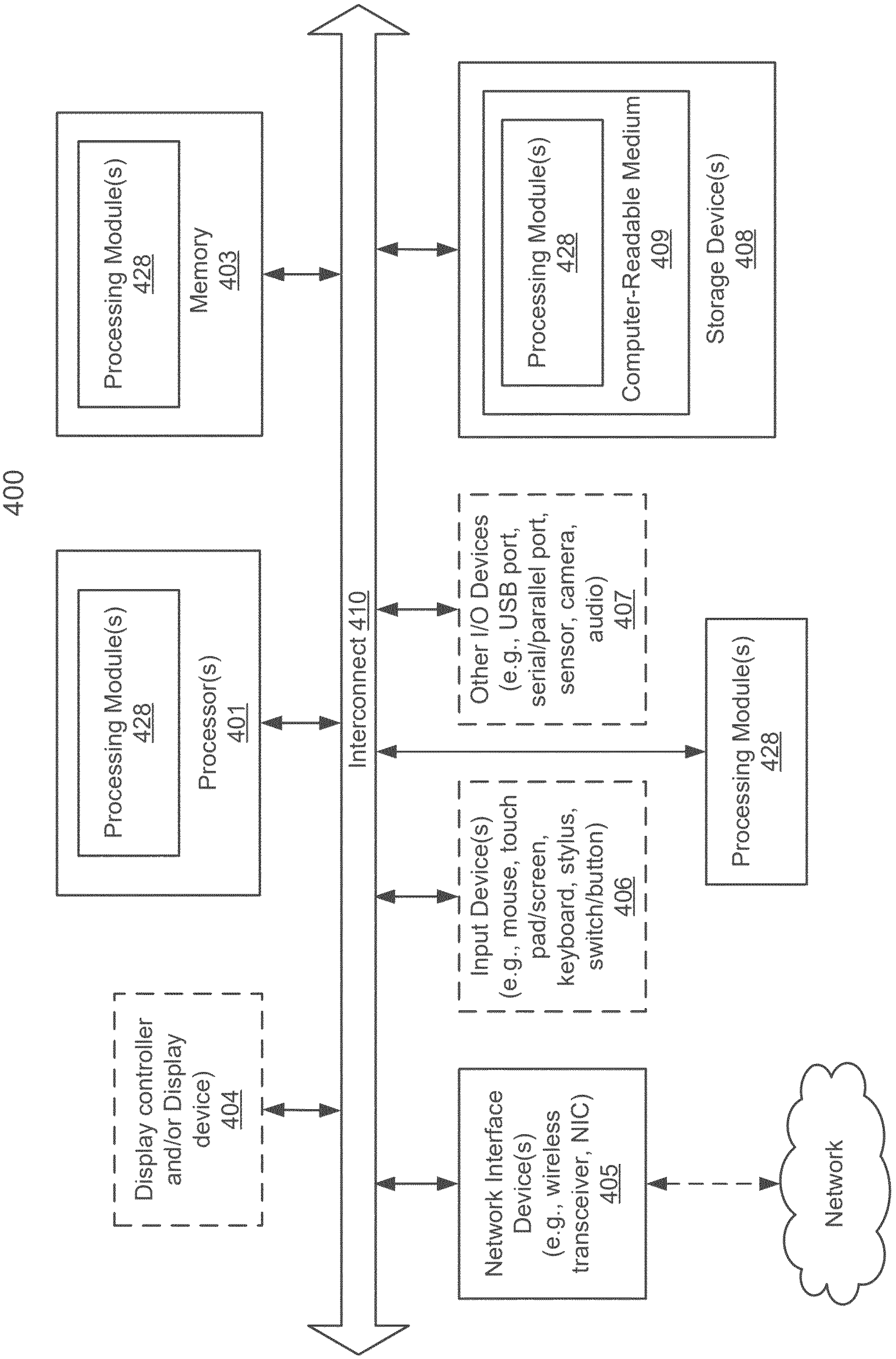
FIG. 4 shows a block diagram illustrating a data processing system in accordance with an embodiment.

Turning to FIG. 1A, a block diagram illustrating a system in accordance with an embodiment is shown. The system shown in FIG. 1A may provide for management of data processing systems that may provide, at least in part, computer-implemented services. The system may include any number of data processing systems 100 (e.g., computing devices) that may each include any number of hardware components (e.g., processors, memory modules, storage devices, communications devices). The hardware components may support execution of any number and types of applications (e.g., software components). Changes in available functionalities of the hardware and/or software components may provide for various types of different computer-implemented services to be provided over time. Refer to FIGS. 1B and 4 for additional details regarding data processing systems 100.

The computer implemented services may be subject to policies (e.g., guidelines, regulations, etc.) that may be defined by administrators (e.g., of data processing systems 100), external entities, etc., and/or that may be enforced based on geographical areas or regions, authorized network connections, etc. For example, depending on the physical location and/or network connection of data processing system 100A, a computer implemented service provided by data processing system 100A may be limited based on an administrator's (e.g., of data processing system 100A) data regulations (e.g., document and/or application access controls) may be prohibited by other policies due to decrease in security posture of data processing system 100A.

Thus, operation of and/or computer implemented services provided by a data processing system (e.g., data processing system 100A) may be modified (e.g., restricted) based on the security posture of the data processing system in order to comply with policies triggered based on differing security postures of data processing systems. However, security posture of a data processing system may be difficult to obtain if hardware resources and/or software resources of the data processing system has limited functionality (e.g., due to lack of network connectivity, power, etc.).

For example, the security posture of data processing system 100A may be identified by an operating system interacting with hardware resources of data processing system 100A to identify an issue impacting the security posture of the system (e.g., data processing system 100A and/or any components thereof). Some of the components of data processing system 100A, such as the operating system may lack network connectivity and therefore, may be unable to communicate with hardware components of data processing system 100A and/or external entities to provide information regarding the security posture of data processing system 100A.

In general, embodiments disclosed herein may provide methods, systems, and/or devices for managing operation of a data processing system based on security posture based policies. The data processing system may include out-of-band components that may communicate with one another without traversing in-band communication channels and without utilizing in-band components. For example, the out-of-band components may identify security posture indicators (e.g., indications of events, components, etc. impacting security posture of the data processing system) for data processing system 100A. By doing so, potentially compromised and/or inoperable in-band components may be circumvented, increasing the likelihood of the security posture being identified, and/or increasing the likelihood of the data processing system operating in compliance with an applicable policy associated with the identified security posture of the data processing system.

To perform the above-mentioned functionality, the system of FIG. 1A may include data processing systems 100, and/or management system 102. Data processing systems 100, management system 102, and/or any other type of devices not shown in FIG. 1A may perform all, or a portion of the computer implemented services independently and/or cooperatively. Each of these components is discussed below.

Data processing systems 100 may include any number and/or type of data processing systems (e.g., 100A-100N). Data processing systems 100 may provide computer implemented services according to their security posture. To do so, data processing systems 100 may include out-of-band components (e.g., a network module, a management controller, etc.), and functionality that may allow data exchange between the out-of-band components independently from in-band components of data processing systems 100. For more information regarding out-of-band components of data processing systems 100, refer to discussion of FIG. 1B.

For example, out-of-band components of data processing systems 100 may (i) obtain at least one security posture indicator, (ii) obtain a security posture based on at least two security posture indicators, (iii) identify any policies triggered by the security posture, (iv) performing an action set to update the operation of the data processing system based on the identified policies, and/or (v) perform any other processes to facilitate computer implemented services.

Management system 102 may include any number and/or type of management systems (e.g., data processing systems, servers, storage devices, user devices, etc.) that may provide computer implemented services, such as management services. To perform its functionality, management system 102 may communicate (e.g., exchange data) with the out-of-band components of data processing systems 100 using out-of-band communication channels. For example, management system 102 may provide management services for data processing system 100A via a management controller of data processing system 100A (e.g., bypassing any in-band components of data processing system 100A).

To provide management services, management system 102 may, for example, (i) provide provisioning information to the management controller (e.g., via out-of-band communication channels), (ii) for the security posture impacting the portion of the data processing system, identifying the corresponding hardware components and restricting/limiting activity of the hardware component (e.g., including software components contributions to functionality of the hardware component), (iii) perform actions (e.g., of an action set) based on the identified portion of hardware components impacted by the security posture, and/or (iv) perform other actions relating to facilitating data processing systems 100 to provide desired computer implemented services.

Management system 102 may cooperatively work with the management controller of a data processing system (e.g., 100A) to perform management services. For example, management system 102 may exchange data and/or information relating to policies corresponding to the identified security posture of the data processing system impacted. The policies may indicate various action sets to be performed by data processing systems in order to update operation of the data processing systems to mitigate potential impacts on the operation of the data processing systems due to the security posture.

Thus, the operation of data processing system 100A may be managed using out-of-band methods (e.g., using out-of-band components and via out-of-band communication channels). By doing so, the security posture may be more likely to be identified, malicious activity and/or operating malfunctions may be more likely to be managed in a timely manner, and/or data processing systems 100 may be more likely to provide the desired computer implemented services.

Figure 3:
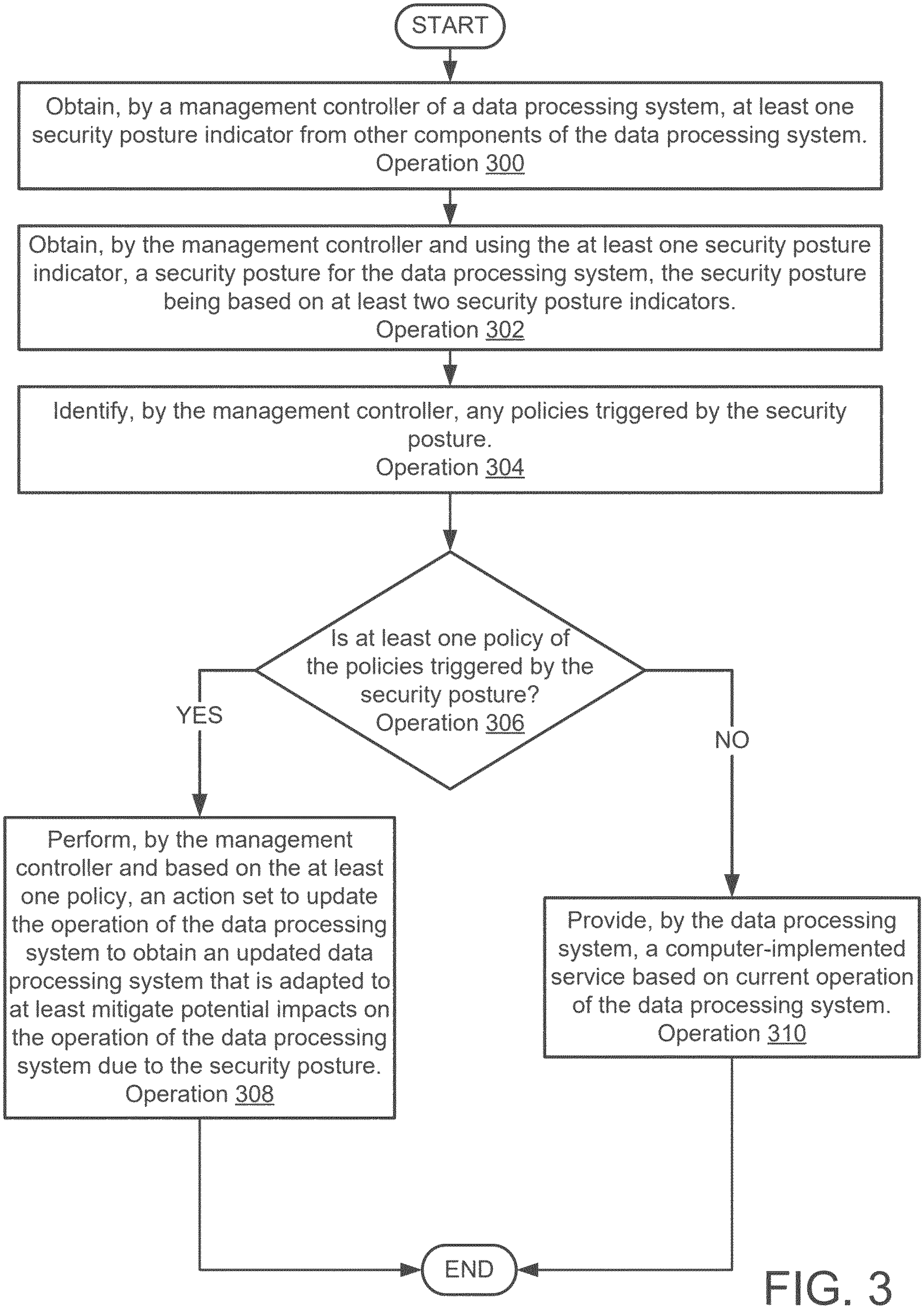
FIG. 3 shows a flow diagram illustrating a method of managing operation of a data processing system in accordance with an embodiment.

When providing their functionality, any of data processing systems 100 and/or management system 100 may perform all, or a portion of the methods shown in FIG. 3.

Any of (and/or components thereof) data processing systems 100 and/or management system 102 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., smartphone), an embedded system, local controllers, an edge node, and/or any other type of data processing device or system. For additional details regarding computing devices, refer to the discussion of FIG. 4.

In an embodiment, one or more of data processing systems 100, and/or management system 102 are implemented using an internet of things (IoT) device, which may include a computing device. The IoT device may operate in accordance with a communication model and/or management model known to any of data processing systems 100, and/or management system 102, and/or other devices.

Any of the components illustrated in FIG. 1A may be operably connected to each other (and/or components not illustrated) with communication system 104. In an embodiment, communication system 104 includes one or more networks that facilitate communication between any number of components. The networks may include wired networks and/or wireless networks (e.g., and/or the Internet). The networks may operate in accordance with any number and/or types of communication protocols (e.g., such as the internet protocol). Communication system 104 may include any number of in-band communication channel and/or out-of-band communication channels.

While illustrated in FIG. 1A as including a limited number of specific components, a system in accordance with an embodiment may include fewer, additional, and/or different components than those illustrated therein. For example, while the system of FIG. 1A shows a single management system (e.g., 102), it will be appreciated that the system may include any number of management systems.

Turning to FIG. 1B, a diagram illustrating data processing system 100A in accordance with an embodiment is shown. Data processing system 100A may be similar to any of data processing systems 100 shown in FIG. 1A.

To provide computer-implemented services, data processing system 100A may include any quantity of hardware resources 150. Hardware resources 150 may be in-band hardware components, and may include a processor operably coupled to memory, storage, and/or other hardware components. Hardware resources 150 may (e.g., via the processor) provide the computer-implemented services desired by users of data processing system 100A.

The processor may host various management entities such as operating systems, drivers, network stacks, and/or other software entities that provide various management functionalities. For example, the operating system and drivers may provide abstracted access to various hardware resources.

To facilitate communication, hardware resources 150 may host a network stack that may facilitate packaging, transmission, routing, and/or other functions with respect to exchanging data with other devices. For example, the network stack may support transmission control protocol/internet protocol communication (TCP/IP) (e.g., the Internet protocol suite) thereby allowing the hardware resources 150 to communicate with other devices via packet switched networks and/or other types of communication networks.

The processor may also host various applications that provide the computer-implemented services. The applications may utilize various services provided by the management entities and use (at least indirectly) the network stack to communicate with other entities.

However, use of the network stack and the services provided by the management entities may place the applications at risk of indirect compromise. For example, if any of these entities trusted by the applications are compromised, these entities may subsequently compromise the operation of the applications. Additionally, if various drivers and/or the communication stack are compromised, communications to/from other devices may be compromised. If the applications trust these communications, then the applications may also be compromised.

For example, to communicate with other entities, an application may generate and send communications to a network stack and/or driver, which may subsequently transmit a packaged form of the communication via channel 170 to a communication component, which may then send the packaged communication (in a yet further packaged form, in some embodiments, with various layers of encapsulation being added depending on the network environment outside of data processing system 100A) to another device via any number of intermediate networks (e.g., via wired/wireless channels 176 that are part of the networks).

To reduce the likelihood of the applications and/or other in-band entities from being indirectly compromised, data processing system 100A may include management controller 152 and network module 160. Each of these components of data processing system 100A is discussed below.

Management controller 152 may operate independently from hardware resources 150 and, therefore, hardware resources 150 may not host and/or manage operation of management controller 152. In addition, management controller 152 may be distinct from hardware resources 150 and, therefore, may be physically separate from hardware resources 150. Management controller 152 may also be operably connected to communication components of data processing system 100A via separate channels (e.g., 172) from the in-band components.

Management controller 152 may be implemented, for example, using a system on a chip or other type of independently operating computing device (e.g., independent from the in-band components, such as hardware resources 150, of a host data processing system 100A).

Management controller 152 may provide various management functionalities for data processing system 100A. For example, management controller 152 may monitor various ongoing processes performed by the in-band component, may manage power distribution, thermal management, and/or other functions of data processing system 100A.

To do so, management controller 152 may be operably connected to various components via side band channels 174 (in FIG. 1B, a limited number of side band channels are included for illustrative purposes, it will be appreciated that management controller 152 may communication with other components via any number of side band channels). The side band channels may be implemented using separate physical channels, and/or with a logical channel overlay over existing physical channels (e.g., logical division of in-band channels). The side band channels may allow management controller 152 to interface with other components and implement various management functionalities such as, for example, general data retrieval (e.g., to snoop ongoing processes), telemetry data retrieval (e.g., to identify a health condition/other state of another component), function activation (e.g., sending instructions that cause the receiving component to perform various actions such as displaying data, adding data to memory, causing various processes to be performed), and/or other types of management functionalities.

For example, to reduce the likelihood of indirect compromise of an application hosted by hardware resources 150, management controller 152 may enable information from other devices to be provided to the application without traversing the network stack and/or management entities of hardware resources 150. To do so, the other devices may direct communications including the information to management controller 152. Management controller 152 may then, for example, send the information via side band channels 174 to hardware resources 150 (e.g., to store it in a memory location accessible by the application, such as a shared memory location, a mailbox architecture, or other type of memory-based communication system) to provide it to the application. Thus, the application may receive and act on the information without the information passing through potentially compromised entities. Consequently, the information may be less likely to also be compromised, thereby reducing the possibility of the application becoming indirectly compromised. Similar processes may be used to facilitate outbound communications from the applications.

Information provided to the application by management controller 152 may include, for example, instructions for implementation of computer-implemented services desired by users of data processing system 100A.

To facilitate communication with other devices, data processing system 100A may include network module 160. Network module 160 may provide communication services for in-band components and out-of-band components (e.g., management controller 152) of data processing system 100A.

To provide the above-described functionalities, network module 160 may include traffic manager 162, interfaces 164, and may host an instance of a TCP/IP stack to facilitate communication with other devices independently of any of the in-band components (e.g., does not rely on any hosted software, hardware components, etc.). Accordingly, compromise of any of hardware resources 150 and hosted component may not result in indirect compromise of network module 160, management controller 152, and entities hosted by management controller 152.

Management controller 152 may be operably connected to communication components of data processing system 100A via separate channels (e.g., 172) from the in-band components, and may implement or otherwise utilize a distinct and independent network stack (e.g., TCP/IP). Consequently, management controller 152 may communicate with other devices independently of any of the in-band components (e.g., does not rely on any hosted software, hardware components, etc.). Accordingly, compromise of any of hardware resources 150 and hosted component may not result in indirect compromise of any management controller 152, and entities hosted by management controller 152.

Traffic manager 162 may include functionality to (i) discriminate traffic directed to various network endpoints advertised by data processing system 100A, and (ii) forward the traffic to/from the entities associated with the different network endpoints. For example, to facilitate communications with other devices, network module 160 may advertise different network endpoints (e.g., different media access control address/internet protocol addresses) for the in-band components and out-of-band components. Thus, other entities may address communications to these different network endpoints. When such communications are received by network module 160, traffic manager 162 may discriminate and direct the communications accordingly (e.g., over channel 170 or channel 172, in the example shown in FIG. 1B, it will be appreciated that network module 160 may discriminate traffic directed to any number of data units and direct it accordingly over any number of channels).

Accordingly, traffic directed to management controller 152 may never flow through any of the in-band components. Likewise, outbound traffic from the out-of-band component may never flow through the in-band components.

To support inbound and outbound traffic, network module 160 may include any number of interfaces 164. Interfaces 164 may be implemented using any number and type of communication devices which may each provide wired and/or wireless communication functionality. For example, interfaces 164 may include a wide area network card, a WiFi card, a wireless local area network card, a wired local area network card, an optical communication card, and/or other types of communication components. These components may support any number of wired/wireless channels 176.

Thus, from the perspective of an external device, the in-band components and out-of-band components of data processing system 100A may appear to be two independent network entities, that may independently addressable, and otherwise unrelated to one another.

Network module 160 may utilize the instance of the TCP/IP stack to allow hardware resources 150 and/or management controller 152 to communicate with other devices via packet switched networks and/or other types of communication networks.

To facilitate management of data processing system 100A over time, hardware resources 150, management controller 152 and/or network module 160 may be positioned in separately controllable power domains. By being positioned in these separately controllable power domains, different subsets of these components may remain powered while other subsets are unpowered.

For example, management controller 152 and network module 160 may remain powered while hardware resources 150 is unpowered. Consequently, management controller 152 may remain able to communication with other devices even while hardware resources 150 are inactive. Similarly, management controller 152 may perform various actions while hardware resources 150 are not powered and/or are otherwise inoperable, unable to cooperatively perform various process, are compromised, and/or are unavailable for other reasons.

To implement the separate power domains, data processing system 100A may include a power source (e.g., 180) that separately supplies power to power rails (e.g., 184, 186) that power the respective power domains. Power from the power source (e.g., a power supply, battery, etc.) may be selectively provided to the separate power rails to selectively power the different power domains. A power manager (e.g., 182) may manage power from power source 180 that is supplied to the power rails (e.g., by providing instructions via side band channels 174). Management controller 152 may cooperate with power manager 182 to manage supply of power to these power domains. Management controller 152 may communicate with power manager 182 via side band channels 174 and/or via other means.

In FIG. 1B, an example implementation of separate power domains using power rails 184-186 is shown. The power rails may be implemented using, for example, bus bars or other types of transmission elements capable of distributing electrical power. While not shown, it will be appreciated that the power domains may include various power management components (e.g., fuses, switches, etc.) to facilitate selective distribution of power within the power domains.

Figure 2A:
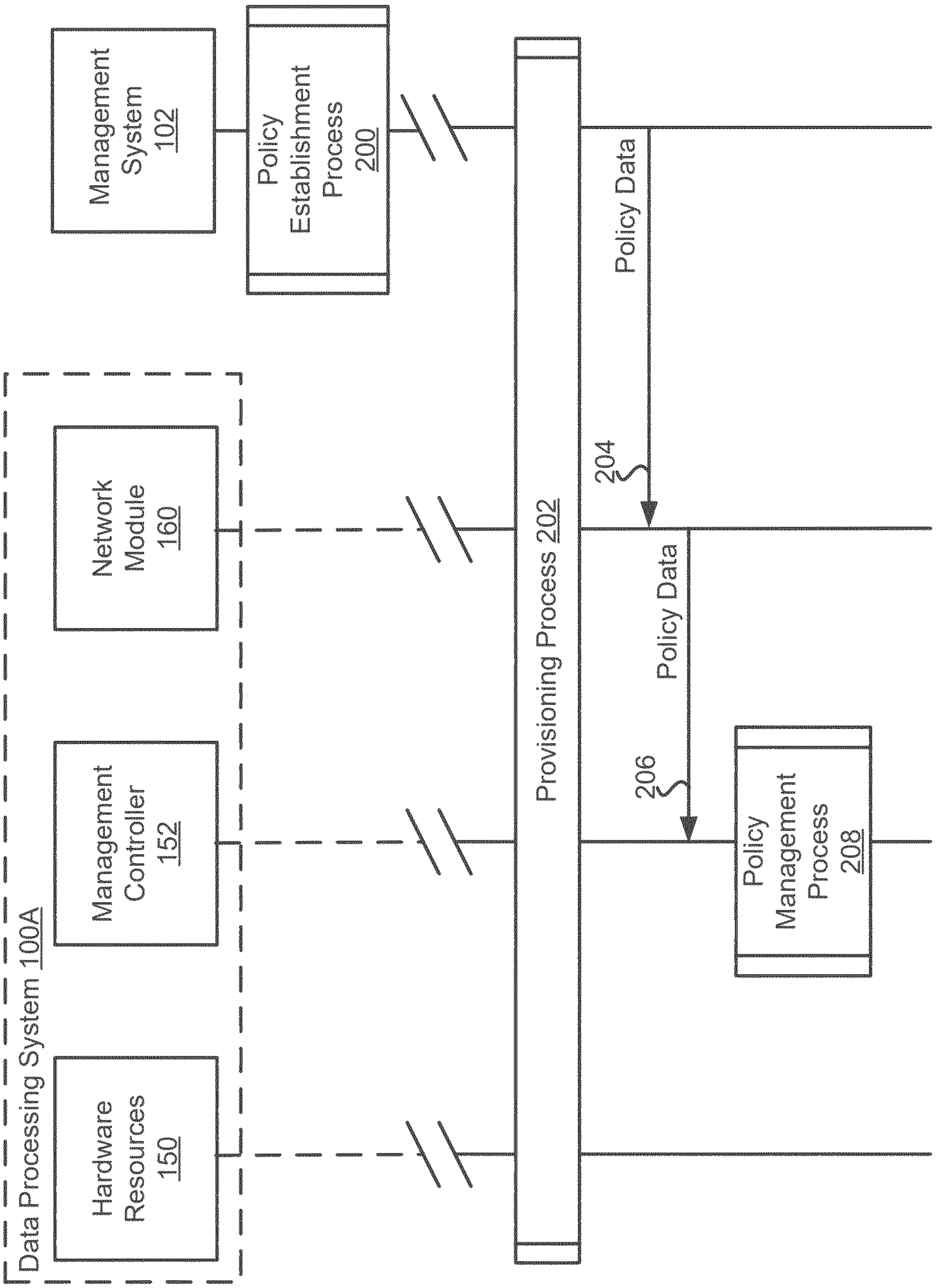
FIGS. 2A-2B show interaction diagrams in accordance with an embodiment.
Figure 2B:
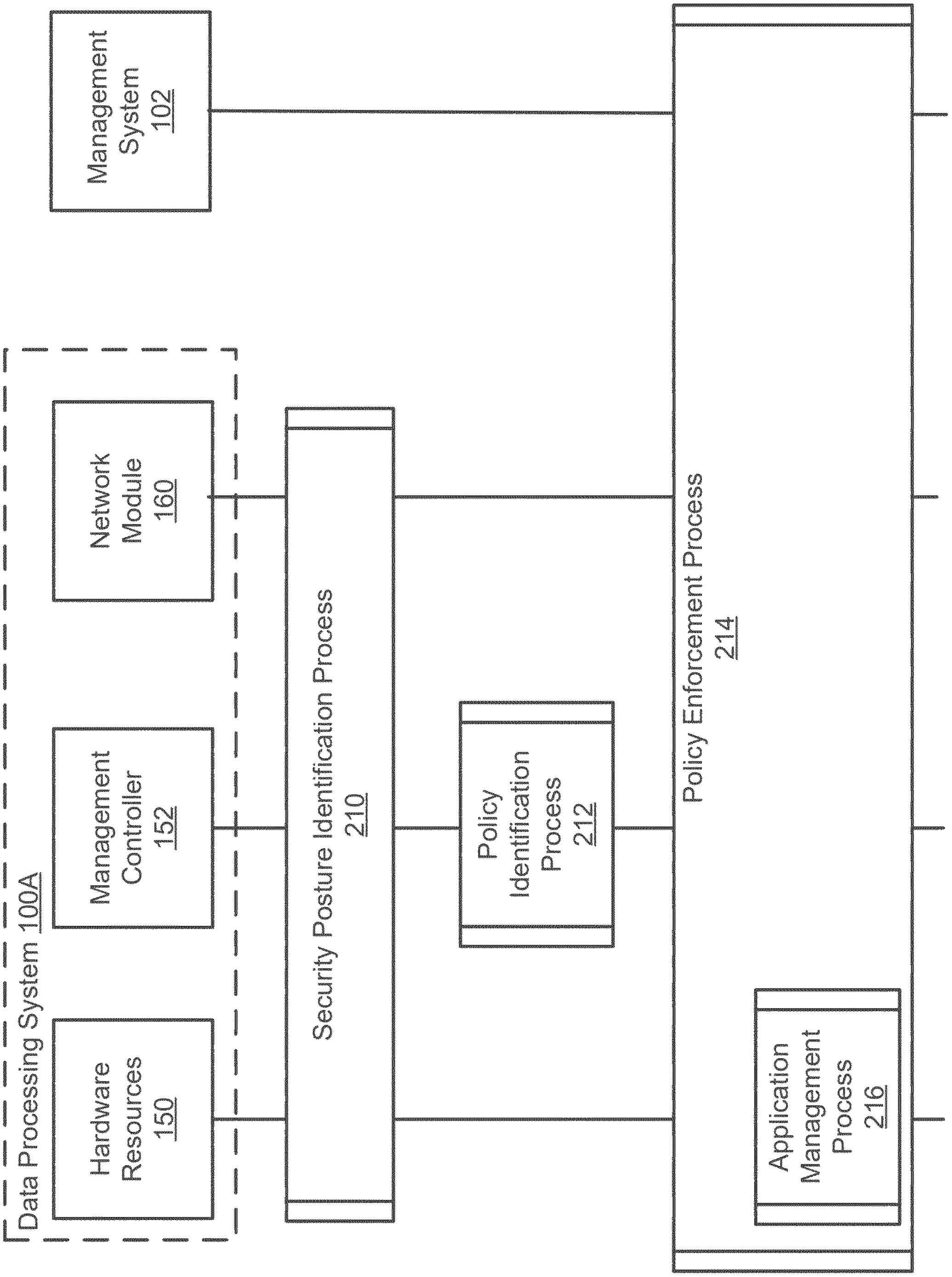

When providing its functionality, management controller 152 may perform all, or a portion, of the methods and operations described in FIGS. 2A-2B.

While illustrated in FIG. 1B with a limited number of specific components, a system may include additional, fewer, and/or different components without departing from embodiments disclosed herein.

To further clarify embodiments disclosed herein, interaction diagrams in accordance with an embodiment is shown in FIGS. 2A-2B. The interaction diagrams may illustrate examples of how data may be obtained and used within the systems of FIGS. 1A-1B.

In the interaction diagrams, processes performed by and interactions between components of a system in accordance with an embodiment are shown. In the diagrams, components of the system are illustrated using a first set of shapes (e.g., 150, 152, etc.), located towards the top of each figure. Lines descend from these shapes. Processes performed by the components of the system are illustrated using a second set of shapes (e.g., 200, 208) superimposed over these lines. Interactions (e.g., communication, data transmissions, etc.) between the components of the system are illustrated using a third set of shapes (e.g., 204, 206, etc.) that extend between the lines. The third set of shapes may include lines terminating in one or two arrows. Lines terminating in a single arrow may indicate that one-way interactions (e.g., data transmission from a first component to a second component) occur, while lines terminating in two arrows may indicate that multi-way interactions (e.g., data transmission between two components) occur.

Generally, the processes and interactions are temporally ordered in an example order, with time increasing from the top to the bottom of each page. For example, the interaction labeled as 204 may occur prior to the interaction labeled as 206. However, it will be appreciated that the processes and interactions may be performed in different orders, any may be omitted, and other processes or interactions may be performed without departing from embodiments disclosed herein.

The processes shown in FIGS. 2A-2B may be performed by any entity shown in the systems of FIGS. 1A-1B (e.g., a device similar to one of data processing systems 100, management system 102, etc.) and/or another entity without departing from embodiments disclosed herein.

Turning to FIG. 2A, a first interaction diagram in accordance with an embodiment is shown. The first interaction diagram may illustrate processes and interactions that may occur during obtaining policies to manage operations of a data processing system.

To obtain the policies, policy establishment process 200 may be initiated by management system 102. Policy establishment process 200 may include establishing policies for managing operations of data processing systems (e.g., any of data processing systems 100A-100N). The policies may be established by an administrator and/or authorized agent of a management entity of data processing systems 100 (e.g., via operation of management system 102) via user input. The policies may include guidelines, regulations, etc. that provide management services for the data processing systems including modifications to operation of hardware and/or software resources of the data processing systems. For example, the policies may include instructions for out-of-band components of the data processing system to implement in order to manage operation of the data processing system to mitigate potential impacts due to the security posture of the data processing system.

Once established, the policies may be provided to the out-of-band components of data processing systems during provisioning process 202. During provisioning process 202, registration and/or provisioning of a data processing system (e.g., 100A) may be performed.

Provisioning process 202 may be initiated by management controller 152 and cooperatively be performed by other components of data processing system 100A and management system 102. For example, management controller 152 may communicate with management system 102 and provide information necessary to obtain provisioning data for data processing system 100A. The information may include, for example, (i) identifying information (e.g., for data processing system 100A and/or a user thereof), (ii) location data for (e.g., the physical location of) data processing system 100A, (iii) authentication information (e.g., usable to authenticate data processing system 100A and/or components thereof), and/or (iv) any other information usable for obtaining provisioning services for data processing system 100A. Based on authentication of data processing system 100A, management system 102 may provide the provisioning data including information usable to set up infrastructure (e.g., virtual and/or physical components) of data processing system 100A.

At interaction 204, policy data may be provided to network module 160 by management system 102. For example, the policy data may be provided to network module 160 via (i) transmission via a message, (ii) storing in a storage with subsequent retrieval by network module 160, (iii) via a publish-subscribe system where network module 160 subscribed to updated from management system 102 thereby causing a copy of the policy data to be propagated to network module 160 and/or via other processes. By providing the policy data to network module 160, network module 160 may receive a copy of the policy data.

The policy data may include policies (e.g., management policies, security policies, etc.) and/or additional information related to the policies (e.g., geographical information relating to the policies, executable instructions for enforcing the policies, etc.). The policies may include various action sets performable by components of data processing system 100A to update operation of data processing system 100A based on the security posture of the data processing system. Refer to FIG. 2B for additional information regarding security posture-based policies.

At interaction 206, the policy data may be provided to management controller 152 by network module 160. For example, the policy data may be provided to management controller 152 via (i) transmission via a message, (ii) storing in a storage with subsequent retrieval by management controller 152, (iii) via a publish-subscribe system where management controller 152 subscribed to updated from network module 160 thereby causing a copy of the policy data to be propagated to management controller 152 and/or via other processes. By providing the policy data to management controller 152, management controller 152 may receive a copy of the policy data.

Once received, the policy data may be utilized during performance of policy management process 208. During policy management process 208, management controller 152 may ingest the policy data to establish guidelines for modifying operations of data processing system 100A (and/or components of data processing system 100A). Management controller 152 may access the policies (and other stored information) during other processes that may be performed to improve compliance of data processing system 102 with respect to one or more of the policies.

For example, management controller 152 may initiate monitoring processes to be performed by hardware resources 150 to identify indicators (also referred herein as "security posture indicators") impacting/contributing to security posture of data processing system 100A.

The security posture indicators may include at least: (i) a geographic location of the data processing system relative to a whitelist of geographic areas, (ii) a hardware componentry of the data processing system relative to a list of expected hardware components, (iii) network connectivity of the data processing system relative to approved network connections, and/or (iv) any other indicators contributing to security posture of the data processing system.

Refer to FIG. 2B for additional information regarding managing operation of data processing systems based on the policies.

Thus, as shown in the example of FIG. 2A, policies for a data processing system may be provided and established by authorized devices (e.g., management system 102) using out-of-band methods. By doing so, policies may be provided to the data processing system without utilizing in-band components and/or without requiring functionality of the data processing system (e.g., powered on, network connection, etc.).

Turning to FIG. 2B, a second interaction diagram in accordance with an embodiment is shown. The second interaction diagram may illustrate example processes and interactions that may occur during policy compliance and enforcement for a data processing system (e.g., 100A).

To perform policy compliance, management controller 152 may perform security posture identification process 210. Security posture identification process 210 may include identifying a security posture of data processing system 100A. To identify the security posture of the data processing system 100A, indications of events, activity, and/or other information contributing to security posture of the data processing system may be identified.

For example, during security posture identification process 210, management controller 152 may determine that an evaluation of hardware resources 150 (and/or software resources, such as, applications hosted by hardware resources 150 of data processing system) is necessary and identify information needed to perform the evaluation of the hardware and/or software resources.

As part of security posture identification process 210, management controller 152 may provide commands to various components of the data processing system to monitor activity of the various components in operation. For example, management controller 152 may initiate a request to network module 160 to obtain location data for data processing system 100A and in response to the request, network module 160 may provide location data (e.g., using wireless wide area networks (WWANs)) for data processing system 100A. Once received, management controller 152 may analyze the location data to identify whether the geographic location of data processing system 100A (e.g., provided by the location data) is one of the geographic locations of a whitelist of geographic areas (e.g., approved geographic areas for data processing system 100A).

Once the security posture is identified (e.g., via security posture identification process 210), management controller 152 may perform policy identification process 212. During policy identification process 212, management controller 152 may use the security posture to perform any type of comparison process with a database of policies keyed to different security postures. For example, management controller 152 may use the security posture as a key to perform a look up in a database of policies. The policies may include different levels of restrictions on operation of the data processing system based on the security posture corresponding to the policies.

For example, a first security policy may specify a first security posture level and a corresponding level of restriction on operation (of data processing system 100A) and a second security policy may specify a second security posture level and a higher level of restriction on operation than compared to the level of restriction on operation specified by the first security policy.

Policy identification process 212 ma include identifying (e.g., by management controller 152) that data processing system 100A is operating out of compliance with respect to policies that apply to the security posture of data processing system 100A. Thus, to improve compliance of data processing system 100A with respect to the applicable policies, management controller 152 may initiate a policy enforcement process.

During policy enforcement process 214, management controller 152 may enforce the applicable policies. The policies may indicate a desired manner of operation of data processing system 100A; therefore, management controller 152 may automatically perform one or more actions (e.g., of an action set that is based on the applicable policies) that update the operation of data processing system 100A to improve compliance of data processing system 100A with respect to the applicable policies.

To perform the one or more actions, management controller 152 may communicate with hardware resources 150 over a side-band communication channel (e.g., similar to side band channel 172 shown and described in FIG. 1B). Performing (one or more actions of) the action set may include, for example, (i) disabling (or enabling) one or more of hardware resources 150, (ii) disabling (or enabling) one or more pieces of software hosted by hardware resources 150, (iii) increasing (or decreasing) authentication requirements (e.g., for access to a portion of functionality of data processing system 100A), (iv) removing a portion of data stored by data processing system 100A, (v) modifying the boot process for data processing system 100A, and/or (vi) other actions relating to policy enforcement (e.g., generating policy enforcement notifications).

As part of policy enforcement process, application management process 216 may be performed. During application management process 216, hardware resources 150 may receive instructions to modify operation of software resources (e.g. hosted by hardware resources 150) of data processing system 100A. For example, disabling or enabling software may include, for example, encrypting portions of data stored by data processing system 100A, limiting the use of applications (e.g., or a portion of functionality of the applications) hosted by hardware resources 150. For example, management controller 152 may disable all functionality of data processing system 100A (e.g., prevent hardware resources 150 from being powered), and/or management controller 152 may continue to perform location monitoring and/or location reporting processes (e.g., reporting location data to other devices via out-of-band communications). Any functionality may be modified, limited, etc., for a period of time and/or until applicable policies indicate the functionality should be enabled.

During policy enforcement process 214, management controller 152 may, for example, disable technology that cannot be exported (e.g., a graphics processing unit (GPU), encryption technology, etc.) and/or hardware resources 150 that may limit functionality of data processing system 100A, such as a trusted platform module (TPM) of data processing system 100A. For example, by disabling the TPM, access to and/or use of secrets stored by the TPM may be prevented. Consequently, data decryption functionality may be lost, signing ability of data structures for device verification may be lost, etc., which may increase the security of data stored by and/or accessible by data processing system 100A.

Modifying the boot process for data processing system 100A may include updating instructions used by and/or providing instructions to the basic input output system (BIOS). For example, the BIOS may verify an embargo status before and/or during performance of a boot process for an operating system installed on data processing system 102. The embargo status may be verified by reading boot instructions (e.g., updated by management controller 152) and/or other types of data structures in which the embargo status may be stored. Based on the boot instructions, different boot paths may be taken. For example, the operating system may not load, portions of the operating system may be loaded, and/or other boot processes may be performed that result in limitations on the functionality of the device.

Performing the action set may also include generating and/or providing notifications regarding policy enforcement and/or updates to the location or operation of data processing system 100A. For example, during the boot process, a user of data processing system 100A may be shown an error message indicating functionality of data processing system 100A may be limited due to the enforcement of the security posture-based policies.

Management controller 152 may, for example, provide a similar notification to an administrator console (e.g., that may monitor and/or manage policy enforcement) via an out-of-band communication channel, and/or may enable functionality that allows the administrator to update and/or control data processing system 100A (e.g., remotely, via the administrator console) via the out-of-band communication channel (e.g., over a network such as a WWAN), independently from the operating system. The administrator, for example, may initiate other actions to be performed by management controller 152 in order to improve the compliance of data processing system 100A with respect to the applicable policies.

As part of policy enforcement process 214, the policies may include performing a supplemental policy test for a function of data processing system 100A that is not taken into account (e.g., during obtaining the security posture indicator(s)). For example, management controller 152 may utilize hardware resources 150 to perform the supplemental policy test to further evaluate the security posture of data processing system 100A and obtain a supplemental policy test result.

Based on the supplemental policy test result indicating a failure of the supplemental policy test, a modifier may be applied to the security posture to obtain an updated security posture (e.g., new security posture of data processing system 100A). The updated security posture may be utilized to identify any policies that may be triggered (e.g., based on the new security posture). The policies triggered by the updated security posture may be enforced in a similar manner as described above during policy enforcement process. 214.

Once policy enforcement process 214 has completed (e.g., the operation of data processing system 100A has been updated to improve compliance with the policies), data processing system 100A may provide computer-implemented services based on the updated operation of hardware resources 150. For example, by updating the operation of hardware resources 150, data processing system 102 may be adapted to mitigate potential impacts due to the security posture and may be able to provide the desired computer-implemented services, which may be expected by and/or relied upon by consumers of the computer-implemented services.

Any of the processes illustrated using the second set of shapes and interactions illustrated using the third set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes and interactions illustrated using the third set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the processes and interactions may be implemented using any type and number of data structures. The data structures may be implemented using, for example, tables, lists, linked lists, unstructured data, data bases, and/or other types of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

As discussed above, the components of FIGS. 1A-2B may perform various methods to improve secure operations of data processing systems by enforcing security posture-based policies via out-of-band communication methods. By enforcing the security posture-based policies, an out-of-band component of data processing systems may be able to implement the policies corresponding to the security posture of the data processing system in a timely manner and thereby, may decrease the likelihood of unauthorized access and/or operation of data processing systems.

FIG. 3 illustrates a method that may be performed by the components of the system of FIGS. 1A-2B. In the diagram discussed below and shown in FIG. 3, any of the operations may be repeated, performed in different orders, and/or performed in parallel with or in a partially overlapping in a timely manner with other operations. The method described with respect to FIG. 3 may be performed by a data processing system and/or another device.

Turning to FIG. 3, a flow diagram illustrating a method of managing a data processing system in accordance with an embodiment is shown. The method may be performed, for example, by a data processing system, a management system, a communication system, a management controller, hardware resources, and/or other components illustrated in FIGS. 1A-2B.

At operation 300, at least one security posture indicator from other components of a data processing system may be obtained by a management controller of the data processing system. The at least one security posture indicator may be obtained via (i) monitoring activity of the other components of the data processing system, (ii) identifying the at least one security posture indicator based on the monitored activity, and/or (iii) performing any other methods.

For example, the management controller may monitor activity of the network module of the data processing and identify a network connectivity that is not one of the approved network connections of the data processing system.

At operation 302, a security posture for the data processing system may be obtained by the management controller and using the at least one security posture indicator. The security posture may be based on at least two security posture indicators. The security posture may be obtained via (i) generation by the management controller, (ii) received from an external entity, and/or (iii) by any other methods. To obtain the security posture via generation, the management controller may perform calculations using the at least two security posture indicators to identify an aggregate of the security posture indicators impacting the data processing system.

At operation 304, any policies triggered by the security posture may be identified by the management controller. The policies may be identified via (i) performing, by the management controller, a comparison process using the security posture and a database of the policies, (ii) providing the policies and the security posture to an external entity to perform any type of identification processes, and/or (iii) by any other methods. To identify the policies triggered by the security posture via performing a comparison process may include using the security posture as a key to perform a look up in a databased of the policies keyed to different security postures of the data processing system.

At operation 306, a determination is made whether at least one of the required applications is not hosted by the hardware resources. The determination may be made based on the result from performing the comparison process described in operation 304.

If it is determined that the required applications are hosted by the hardware resources (e.g., the determination is "No" at operation 206), then the method may end following operation 306.

Returning to operation 306, if it is determined that at least one policy of the policies is triggered by the security posture (e.g., the determination is "Yes" at operation 306), then the method may proceed to operation 308.

At operation 308, an action set may be performed to update the operation of the data processing system to obtain an updated data processing system that is adapted to at least mitigate potential impacts on the operation of the data processing system due to the security posture. The action set may include: (i) performing, by the management controller, a supplemental policy test for a function of the data processing system that is not taken into account in the obtaining of the at least one security posture indicator to obtain a supplemental policy test result, (ii) disabling, by the management controller, a portion of the other components of the data processing system, (iii) disabling, by the management controller, a piece of software hosted by the other components of the data processing system, and/or (iv) performing any other methods.

Performing the supplemental policy test may include making a determination whether the supplemental policy test result indicates a failure of the supplement policy test. If it is determined that the supplemental policy test result indicates a failure of the supplement policy test, the method may include: (i) applying a modifier to the security posture to obtain an updated security posture, (ii) identifying any policies triggered by the updated security posture, and/or (iii) performing, by the management controller and based on the at least one policy of the policies that is triggered by the updated security posture, a second action set. The second action set may be performed to update the operation of the updated data processing system to obtain a second updated data processing system that is adapted to at least mitigate potential impacts on the operation of the data processing system due to the updated security posture.

Applying the modifier to the security posture may include adding a modification to the security posture (e.g., recalculating the security posture based on the failure of the supplement policy test).

Identifying any policies triggered by the updated security posture may be performed via performing a comparison process using the updated security posture and a database of policies corresponding to different security postures of a data processing system.

Performing the second action set may include: (i) enabling, by the management controller, a portion of the other components of the data processing system, (ii) enabling, by the management controller, a piece of software hosted by the other components of the data processing system, (iii) disabling, by the management controller, the portion of the other components of the data processing system, (iv) shutting down operation of the data processing system, and/or (v) performing any other methods.

Using the methods illustrated in FIG. 3, embodiments disclosed herein may provide systems and methods usable to manage operations of data processing systems by implementing policies corresponding to security posture of the data processing systems using out-of-band methods. By implementing the policies based on the security posture of the data processing system, the operations of the data processing system may be updated. By updating operation of the data processing system, impacts on the operation of the data processing system due to the security posture may be mitigated and the desired computer implemented services may be more likely to be provided.

Any of the components illustrated in FIGS. 1A-3 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:

obtaining, by a management controller of the data processing system, at least one security posture indicator from other components of the data processing system;

obtaining, by the management controller and using the at least one security posture indicator, a security posture for the data processing system, the security posture being based on at least two security posture indicators;

identifying, by the management controller, any policies triggered by the security posture; and in a first instance of the identifying where at least one policy of the policies is triggered by the security posture: performing, by the management controller and based on the at least one policy, an action set to update the operation of the data processing system to obtain an updated data processing system that is adapted to at least mitigate potential impacts on the operation of the data processing system due to the security posture, wherein the data processing system has a single network module that separately advertises network endpoints for the management controller and hardware resources of the data processing system such that first communications using an in-band communication channel for the hardware resources never flow through the management controller and second communications using an out-of-band communication channel for the management controller never flow through the hardware resources.

2. The method of claim 1, wherein the policies comprise:

a first security policy that specifies a first security posture level and a corresponding level of restriction on operation of the data processing system; and a second security policy that specifies a second security posture level.

3. The method of claim 2, wherein the second security policy also specifies a higher level of restriction on operation of the data processing system than the level of restriction on operation of the data processing system specified by the first security policy.

4. The method of claim 1, wherein the action set comprises:

performing, by the management controller, a supplemental policy test for a function of the data processing system that is not taken into account in the obtaining of the at least one security posture indicator to obtain a supplemental policy test result;

in a first instance of the performing of the supplemental policy test where the supplemental policy test result indicates a failure of the supplemental policy test:

applying a modifier to the security posture to obtain an updated security posture; and identifying any policies triggered by the updated security posture; and in a first instance of the identifying where at least one policy of the policies is triggered by the updated security posture:

performing, by the management controller and based on the at least one policy of the policies that is triggered by the updated security posture, a second action set to update the operation of the updated data processing system to obtain a second updated data processing system that is adapted to at least mitigate potential impacts on the operation of the data processing system due to the updated security posture.

5. The method of claim 1, wherein the action set comprises at least one action selected from a list of actions consisting of:

disabling, by the management controller, a portion of the other components of the data processing system; and disabling, by the management controller, a piece of software hosted by the other components of the data processing system.

6. The method of claim 1, wherein the at least one security posture indicator comprises at least one indicator from a list of indicators consisting of:

a geographic location of the data processing system relative to a whitelist of geographic areas;

a hardware componentry of the data processing system relative to a list of expected hardware components; and network connectivity of the data processing system relative to approved network connections.

7. The method of claim 1, wherein the policies are managed, via the second communications and the out-of-band communication channel, by a management system tasked with managing the operation of the data processing system.

8. The method of claim 7, wherein the policies are defined by a subject matter expert.

9. The method of claim 7, wherein the policies are keyed to the security posture.

10. The method of claim 1, wherein the management controller and the single network module are on separate power domains from the hardware resources so that the management controller and the single network module are operable while the hardware resources are inoperable.

11. The method of claim 1, wherein the single network module hosts a transmission control protocol/internet protocol (TCP/IP) stack to facilitate network communications via the out-of-band communication channel.

12. A non-transitory machine-readable medium having instructions stored therein, which when executed by a processor, cause the processor to perform operations for managing operation of a data processing system, the operations comprising:

obtaining, by a management controller of the data processing system, at least one security posture indicator from other components of the data processing system;

obtaining, by the management controller and using the at least one security posture indicator, a security posture for the data processing system, the security posture being based on at least two security posture indicators;

identifying, by the management controller, any policies triggered by the security posture; and in a first instance of the identifying where at least one policy of the policies is triggered by the security posture: performing, by the management controller and based on the at least one policy, an action set to update the operation of the data processing system to obtain an updated data processing system that is adapted to at least mitigate potential impacts on the operation of the data processing system due to the security posture, wherein the data processing system has a single network module that separately advertises network endpoints for the management controller and hardware resources of the data processing system such that first communications using an in-band communication channel for the hardware resources never flow through the management controller and second communications using an out-of-band communication channel for the management controller never flow through the hardware resources.

13. The non-transitory machine-readable medium of claim 12, wherein the policies comprise:

a first security policy that specifies a first security posture level and a corresponding level of restriction on operation of the data processing system; and a second security policy that specifies a second security posture level.

14. The non-transitory machine-readable medium of claim 13, wherein the second security policy also specifies a higher level of restriction on operation of the data processing system than the level of restriction on operation of the data processing system specified by the first security policy.

15. The non-transitory machine-readable medium of claim 12, wherein the action set comprises:

performing, by the management controller, a supplemental policy test for a function of the data processing system that is not taken into account in the obtaining of the at least one security posture indicator to obtain a supplemental policy test result;

in a first instance of the performing of the supplemental policy test where the supplemental policy test result indicates a failure of the supplemental policy test:

applying a modifier to the security posture to obtain an updated security posture; and identifying any policies triggered by the updated security posture; and in a first instance of the identifying where at least one policy of the policies is triggered by the updated security posture:

performing, by the management controller and based on the at least one policy of the policies that is triggered by the updated security posture, a second action set to update the operation of the updated data processing system to obtain a second updated data processing system that is adapted to at least mitigate potential impacts on the operation of the data processing system due to the updated security posture.

16. A data processing system, comprising:

a single network module;

a processor; and a memory coupled to the processor to store instructions, which when executed by the processor, cause the processor to perform operations for managing operation of the data processing system, the operations comprising:

obtaining, by a management controller of the data processing system, at least one security posture indicator from other components of the data processing system;

obtaining, by the management controller and using the at least one security posture indicator, a security posture for the data processing system, the security posture being based on at least two security posture indicators;

identifying, by the management controller, any policies triggered by the security posture; and in a first instance of the identifying where at least one policy of the policies is triggered by the security posture: performing, by the management controller and based on the at least one policy, an action set to update the operation of the data processing system to obtain an updated data processing system that is adapted to at least mitigate potential impacts on the operation of the data processing system due to the security posture, wherein the single network module separately advertises network endpoints for the management controller and hardware resources of the data processing system such that first communications using an in-band communication channel for the hardware resources never flow through the management controller and second communications using an out-of-band communication channel for the management controller never flow through the hardware resources.

17. The data processing system of claim 16, wherein the policies comprise:

a first security policy that specifies a first security posture level and a corresponding level of restriction on operation of the data processing system; and a second security policy that specifies a second security posture level.

18. The data processing system of claim 17, wherein the second security policy also specifies a higher level of restriction on operation of the data processing system than the level of restriction on operation of the data processing system specified by the first security policy.

19. The data processing system of claim 16, wherein the action set comprises:

performing, by the management controller, a supplemental policy test for a function of the data processing system that is not taken into account in the obtaining of the at least one security posture indicator to obtain a supplemental policy test result;

in a first instance of the performing of the supplemental policy test where the supplemental policy test result indicates a failure of the supplemental policy test:

applying a modifier to the security posture to obtain an updated security posture; and identifying any policies triggered by the updated security posture; and in a first instance of the identifying where at least one policy of the policies is triggered by the updated security posture:

performing, by the management controller and based on the at least one policy of the policies that is triggered by the updated security posture, a second action set to update the operation of the updated data processing system to obtain a second updated data processing system that is adapted to at least mitigate potential impacts on the operation of the data processing system due to the updated security posture.

20. The data processing system of claim 16, wherein the action set comprises at least one action selected from a list of actions consisting of:

disabling, by the management controller, a portion of the other components of the data processing system; and disabling, by the management controller, a piece of software hosted by the other components of the data processing system.

* * * * *